United States Patent [19]
Lurie et al.

[11] Patent Number: 5,351,327
[45] Date of Patent: Sep. 27, 1994

[54] POLISHED FIBER OPTIC FERRULES

[75] Inventors: Edward B. Lurie, Matawan, N.J.; Raman K. Selli, Bracknell, England

[73] Assignee: Minnesota Mining and Manufacturing Company, St. Paul, Minn.

[21] Appl. No.: 82,985

[22] Filed: Jun. 25, 1993

[51] Int. Cl.⁵ .............................................. G02B 6/36
[52] U.S. Cl. ........................................ 385/78; 385/85
[58] Field of Search .................. 385/60, 61, 68, 78, 385/85, 53, 55, 57, 79, 80

[56] References Cited
U.S. PATENT DOCUMENTS

| | | | |
|---|---|---|---|
| 4,615,581 | 10/1986 | Morimoto | 350/96.21 |
| 4,695,126 | 9/1987 | Cook | 350/93.21 |
| 4,831,784 | 5/1989 | Takahashi | 51/131.1 |
| 4,978,193 | 12/1990 | Tomita | 350/96.21 |
| 4,979,334 | 12/1990 | Takahashi | 51/120 |
| 5,062,682 | 11/1991 | Marazzi | 385/85 |
| 5,066,094 | 11/1991 | Takahashi | 385/73 |
| 5,140,660 | 8/1992 | Takahashi | 385/79 |
| 5,245,684 | 9/1993 | Terao et al. | 385/78 |

FOREIGN PATENT DOCUMENTS

| | | |
|---|---|---|
| 194325 | 8/1989 | European Pat. Off. . |
| 419699 | 4/1991 | European Pat. Off. . |
| 2910860 | 9/1980 | Fed. Rep. of Germany ........ 385/85 |
| 59-38707 | 3/1984 | Japan . |
| 1-121805 | 5/1989 | Japan . |

*Primary Examiner*—John D. Lee
*Assistant Examiner*—John Ngo
*Attorney, Agent, or Firm*—Gary L. Griswold; Walter N. Kirn; Jack V. Musgrove

[57] ABSTRACT

A method of polishing ferrules used in optical fiber connectors centers the apex of the spherical end face of the ferrule on the fiber axis. The invention is directed to ferrules whose ends are angled and generally spherical, providing angled physical contact (APC) between a pair of interconnected fibers. These ferrules commonly have a chamfer from the outermost diameter leading to the spherical, angled end face. In such prior art ferrules, the apex of the spherical end face does not coincide with the fiber axis, leading to a potential gap between the fiber ends, which affects several performance factors, including insertion loss, stability and repeatability. The present invention provides several practical methods for imparting an APC finish to a chamfered ferrule while maintaining the apex of the spherical end face on the fiber axis.

7 Claims, 4 Drawing Sheets

POLISHED FIBER OPTIC FERRULES

BACKGROUND OF THE INVENTION

1. Field of the Invention

The present invention generally relates to devices for interconnecting telecommunications lines, and more particularly to a method for preparing a ferrule used in a fiber optic connector.

2. Description of the Prior Art

In the last few years, optical fibers have replaced copper wire as the preferred medium for carrying telecommunications signals. As with copper wire, it is necessary to provide for the interconnection of optical fibers, during installation, repair or replacement of the fibers. There are generally two kinds of interconnection devices, splices and connectors. The term "splice" usually refers to a device which provides a permanent connection between a pair of optical fibers. The term "connector," in contrast, usually refers to a device which may be engaged and disengaged repeatedly, often with a different plug or receptacle. The present invention is directed to such a device, although the term "connector" should not be construed in a limiting sense since the present invention may inherently provide a permanent, as well as temporary connection.

There are two primary types of commercially available fiber optic connectors, ferrule connectors and biconic connectors. Ferrule connectors use a cylindrical alignment member, typically ceramic, having a central bore which receives a single optical fiber. Biconic connectors use a plug in the shape of a truncated cone. Both connectors usually combine a pair of plugs fitting into a common socket or receptacle to provide a completed connection. The prior art further recognizes that signal transmission across a connector may be improved by imparting an angled finish to the end face of the fibers. This construction results in reduced internal reflections of the signals at the end face. See, e.g., U.S. Pat. Nos. 5,062,682 and 5,066,094, European Patent No. 194,325, and Japanese Patent Application (Kokai) No. 1-121805.

The requirement for extremely low reflectivity connectors is becoming more stringent, particularly in high speed, single-mode fibers where laser sources are used. Cable television (CATV) operators presently require less than $-50$ dB reflectivity, and this standard will probably also be adopted by all telephony providers. Reflectivity performance must also be consistent, repeatable, and stable under environmental extremes. At the same time, insertion loss is required to be less than 0.5 dB. Early prior art focused on reducing reflections at the expense of higher insertion loss (attenuation), by providing an air gap between the angled connector fiber ends. See U.S. Pat. No. 4,695,126. In the ferrule construction of Japanese Patent Application (Kokai) No. 59-38707, the air gap is minimized by inclining only part of the ferrule end face, but this still degrades loss by at least 0.35 dB, and connection stability and repeatability is poor due to resonant Fresnel reflections.

The construction shown in U.S. Pat. No. 4,615,581 eliminates the air gap, but this construction utilizes a capillary which presents several new problems. First, the fiber must survive relatively sharp bends, which could cause fiber damage during insertion, and over the long term due to static fatigue. Secondly, the insert is difficult to reliably manufacture, and the resulting connector assembly is quite costly. Finally, slight end gapping may still occur if the ferrule end faces are not held extremely close to the 90° interface. Another design (U.S. Pat. No. 4,978,193) attempts to overcome fiber gapping by applying the angular plane in an accruate factory process, and then field polishing only to the pre-angled surface, by using a hard ceramic ferrule material as a stop. This design requires rigid tolerances in keying the paired connectors together; if the key tolerances are not extremely tight, or change with axial or rotational disturbances, then an air gap will result, with all the corresponding drawbacks.

Loss values of less than 0.25 dB have been achieved in prior art angled connectors, typically by using ferrules whose ends have a spherical shape, to provide forcible physical contact (PC) between the interconnected fiber end faces, as illustrated in U.S. Pat. No. 5,140,660. This design also overcomes an earlier problem relating to forming an angled, spherical surface on a ferrule whose end is beveled or chamfered. The ferrules are chamfered in order to minimize the amount of grinding and polishing required to finish the ferrule end, and to facilitate proper alignment of the ferrules within the connector receptacle. As illustrated in FIG. 1, however, in forming an angled, spherical end face on such a chamfered ferrule 10, the apex 12 of the resulting spherical surface 14 does not coincide with the fiber axis 16, i.e., with the radial center of the ferrule (cf. FIG. 3 of the '660 patent). In this regard, the term "apex" as used herein refers to that point on spherical surface 14 whose tangent is generally parallel with the angle of inclination $\theta$ of spherical surface 14. The angle of inclination $\theta$ may further be generally defined with respect to the line formed between the diametrically opposed points A and B where spherical surface 14 intersects the chamfered surface 18. Those skilled in the art will appreciate, however, that surface 14 may not be perfectly spherical, and in fact is often aspherical near points A and B, although it very closely approximates a spherical surface near its center. Therefore, the tangent at apex 12 may not be perfectly parallel with the line between points A and B; similarly, the term "spherical" should not be construed in a limiting sense.

The non-coincidence of apex 12 and fiber axis 16 leads to a gap between the fiber ends (this effect is exaggerated in FIG. 1 due to the microscopic dimensions involved). The '660 patent suggests that this problem is unavoidable if the angled plane is adjacent to the circumferential chamfer, so it eliminates the problem by providing a smaller diameter tip on the ferrule which extends beyond the chamfer. The design of the '660 patent, however, still has several drawbacks. The design inherently requires a sharp leading edge of the angled end face, which can cause cutting, chipping or scraping of the various types of alignment sleeves and housings or receptacles, since the materials used in alignment components are soft compared with the zirconia and alumina ceramics typically used to fabricate the ferrules. This may create debris which can get lodged between the ferrule end faces and consequently degrade transmission. The stepped cylindrical shape of the '660 design also may not safely mate with the receptacles of existing or future electro-optic devices such as LED's (light-emitting diodes) and lasers, with the possibility of damaging such devices. It would, therefore, be desirable and advantageous to devise a method of imparting an angled finish to a ferrule end face which does not require the smaller diameter tip extending beyond the chamfer, and yet still centers the apex of the angled face very near the fiber axis in order to minimize any possible gap between the fiber ends.

SUMMARY OF THE INVENTION

The present invention provides a ferrule comprising a cylindrical body having a chamfered end and a central bore for receiving an optical fiber, the angled end face of the ferrule being generally spherical and having an apex which is approximately centered on the bore (at least within 50 μm, and typically within 10 μm). Several methods are set forth for fabricating such a ferrule. Most of these methods require forming a temporary, inclined end face on the ferrule, adjacent to the chamfer, and then repolishing to form the spherical surface with the centered apex.

In three of these methods, the temporary surface is flat, and is inclined at the desired angle of inclination (usually about 8°). In the first of these three methods, a new, uniform chamfer is created after forming the flat, inclined surface, by regrinding the ferrule end. The ferrule then undergoes conventional polishing (against a compliant pad) which, due to the redefined chamfer, centers the apex on the fiber axis. In the second of the three methods requiring the temporary flat surface, the spherical surface is polished at an angle slightly steeper than the desired angle of inclination, shifting the apex towards the fiber axis. In the third of these methods, a cylindrical surface is formed over the flat surface.

A fourth method imparts a temporary surface which is spherical, by using a concave generator tool which grinds the ferrule as it rotates in a spindle. In another method, there is no temporary surface, i.e., there is only one polishing step, in which the ferrule end face is polished at an angle slightly steeper than the desired angle of inclination. This method requires strict control of the starting end face diameter, polish angle and radius of curvature of the spherical surface. Certain steps in each of these methods may be replaced by molding the ferrule in situ. The resulting connectors provide very low reflectivity (typically −70 to −80 dB) and low attenuation (∼0.2 dB) with excellent stability (±0.2 dB).

BRIEF DESCRIPTION OF THE DRAWINGS

The novel features and scope of the invention are set forth in the appended claims. The invention itself, however, will best be understood by reference to the accompanying drawings, wherein:

DESCRIPTION OF THE PREFERRED EMBODIMENT

Figure 1:
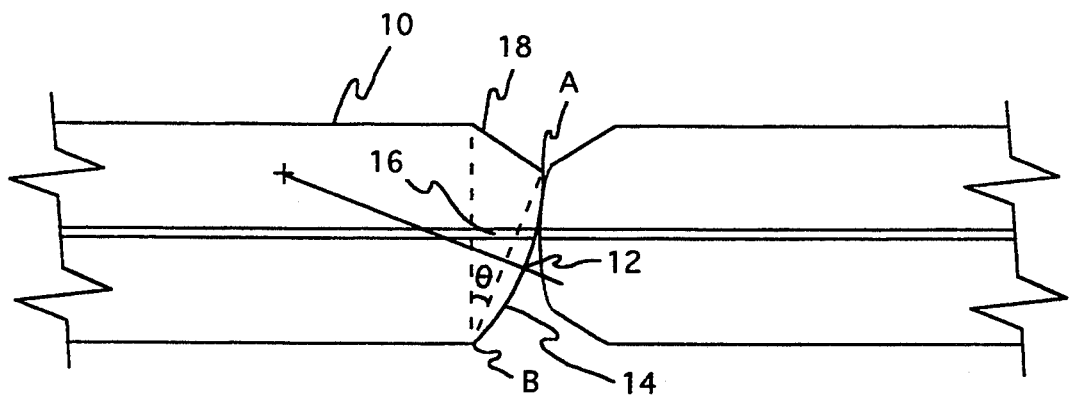
FIG. 1 is an exaggerated side elevational view of two angled physical contact (APC) ferrules constructed according to the prior art.
Figure 2:
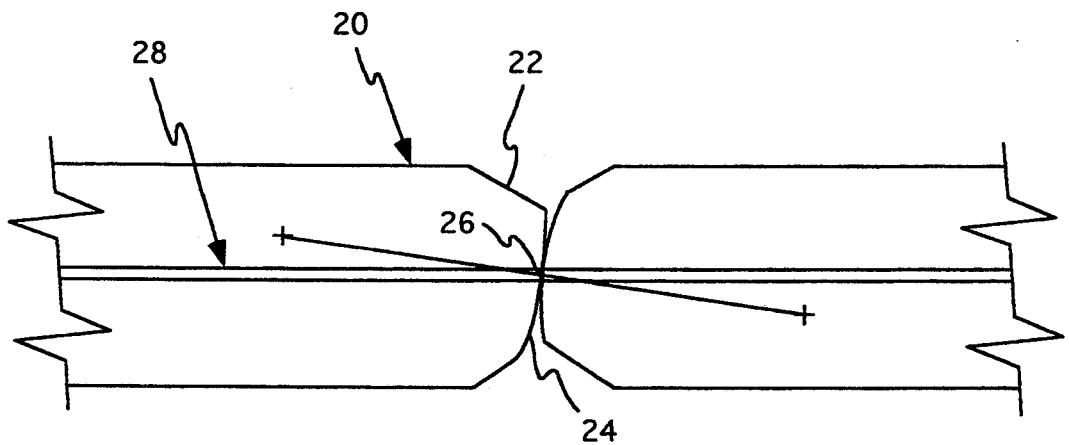
FIG. 2 is a side elevational view of two APC ferrules constructed according to the present invention, illustrating the apex of the spherical surface coinciding with the fiber axis.

With reference now to the figures, and in particular with reference to FIG. 2, the present invention generally comprises a ferrule 20 for an optical fiber connector (including ST, SC, FC, etc., connector formats), the ferrule 20 having a generally cylindrical body with a central bore for receiving the fiber, a chamfered end 22, and an angled, spherical end face 24. Even though spherical end face 24 is adjacent to the chamfer, ferrule 20 still centers the apex 26 of angled face 24 on the fiber axis 28. The present invention contemplates several methods for achieving this construction, resulting in centering of the apex to within 50 μm of the fiber axis. As noted further below, this construction results in excellent reflectivity and insertion loss, and improved stability and repeatability of connector performance.

Figure 3:
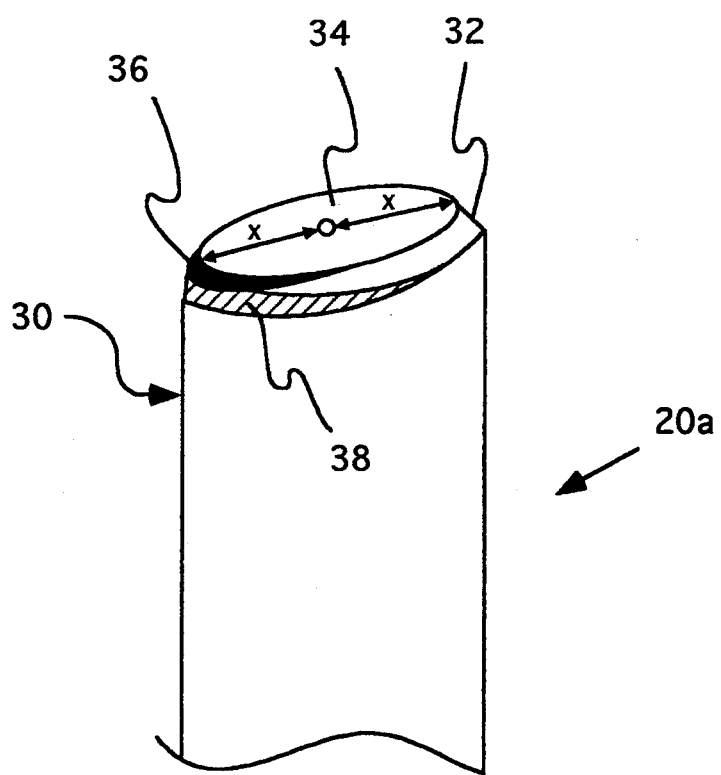
FIG. 3 is a perspective view depicting one method of constructing a ferrule in accordance with the present invention, wherein a uniform chamfer is redefined after forming the temporary flat, angled surface.

One method of preparing the ferrule, illustrated in FIG. 3, compensates for the uneven edge-to-center distances of the angled face by adding a uniform chamfer around the entire circumference of the angled face. FIG. 3 depicts the distal portion of a ferrule 20a terminating in a distal end 30 which has a beveled or chamfered periphery 32, initially formed by conventional means, such as in situ molding of the ferrule or grinding of distal end 30. An angled end face 34 is formed on distal end 30 using a modified polishing apparatus, such as those described in U.S. Patent Nos. 4,831,784 and 4,979,334; however, the polishing film should have a rigid backing, such as glass or metal, rather than the compliant backings set forth in those patents. Polishing is performed with ferrule 20a oriented at the appropriate angle with respect to the polishing film (in the range of 2°–20° but typically about 8°). The jig holding the ferrule is oriented at the appropriate angle rather than being orthogonal to the pad. The jig should have keying means to prevent the ferrule from twisting while being polished. Polishing with a hard backing results in end face 34 being flat at first; the shaded area 36 shown in FIG. 3 is part of end face 34 at this stage of the ferrule preparation, although it is removed in the next step, as described below. Thus, end 30 of ferrule 20a is very similar to that shown in U.S. Pat. No. 4,978,193 at this stage of preparation.

After making the flat angled finish, a uniform chamfer is formed around the entire periphery of surface 34 by re-grinding end 30; the cross-hatched area 38 in FIG. 3 merges with the original chamfer 32 to form the redefined chamfer. The shaded material 36 is removed in this process. In this method, the distances x (from the fiber axis to the edge of surface 34) become equal as the shaded material 36 is removed; as noted below, however, it is not necessary for these two distances to be equal to achieve the construction of FIG. 2 and, indeed, these distances are not equal when the ferrule is constructed in accordance with several of the remaining methods. After the chamfer is redefined, end face 34 is then formed into a spherical surface by replacing the rigid backing on the polishing apparatus with a (conventional) compliant rubber pad and lapping film (or, less preferably, a rigid pad which is concave), and repeating the polishing process (with ferrule 20a oriented at the same angle as in the first polishing step). It has been empirically found that the apex of the subsequently formed spherical surface naturally centers itself on the fiber axis of ferrule 20a.

It should also be noted that, while several of the disclosed methods "shift" the apex toward the fiber axis, the angle of inclination of surface 34 remains relatively constant. A trial of twenty ferrules prepared in accordance with this method yielded connectors having an average insertion loss of −0.2 dB ±0.02 dB, and a reflectivity of −82 dB ±0.5 dB.

Figure 4:
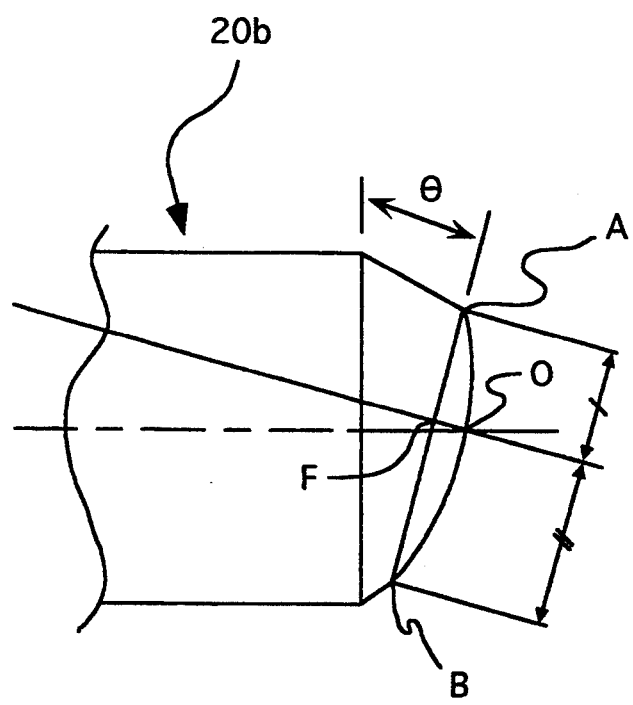
FIG. 4 is a side elevational view depicting another method of constructing a ferrule in accordance with the present invention, wherein the ferrule is polished at a steeper angle than the desired angle of inclination.

Referring now to FIG. 4, another method pushes or biases the apex over the optical center by polishing the end face at a steeper angle on a compliant polishing pad. First, a flat finish is formed on ferrule 20b as with the foregoing method, at the desired angle of inclination $\theta$, forming a corresponding plane of inclination along line AB. The chamfer remains uneven and is not corrected in the secondary operation, i.e., the distances AF and BF are not equal (AF and BF are the distances from the edge of the chamfer to the bore, along the major axis of the generally elliptical shaped defined by the ferrule end face). The secondary operation simply comprises replacement of the rigid backing and polishing film with a compliant backing and polishing film, and polishing at an angle which is slightly steeper than $\theta$. Specifically, it has empirically been determined that, in the second polishing operation, ferrule 20b should be oriented at an oblique angle $\theta$ according to the equation:

$$\phi = \frac{BF}{AF} \times \theta.$$

This method is preferably practiced on a ferrule whose initially formed endface has a smaller diameter (e.g., 1.4 mm). Grinding a smaller endface makes it easier to "shift" the apex and saves 30%–40% of processing time. Based on this dimension, the distances AF and BF are 0.7069 mm and 0.8317 mm, respectively. Assuming an angle of inclination of 8°, this would result in a secondary polishing operation with ferrule 20b oriented at an angle $$\phi = \frac{0.8317}{0.7069} \times 8° = 9.412°.$$

Polishing at the second angle effectively centers the apex on the fiber axis by applying a greater force to the end face along the area between points O and B. A trial of ten ferrules prepared in accordance with this method yielded connectors having an average insertion loss of −0.23 dB ±0.015 dB, and a reflectivity of −82.4 dB ±0.5 dB, and a mean radius centering (apex) of 13 μm with 6 μm sigma.

Figure 5:
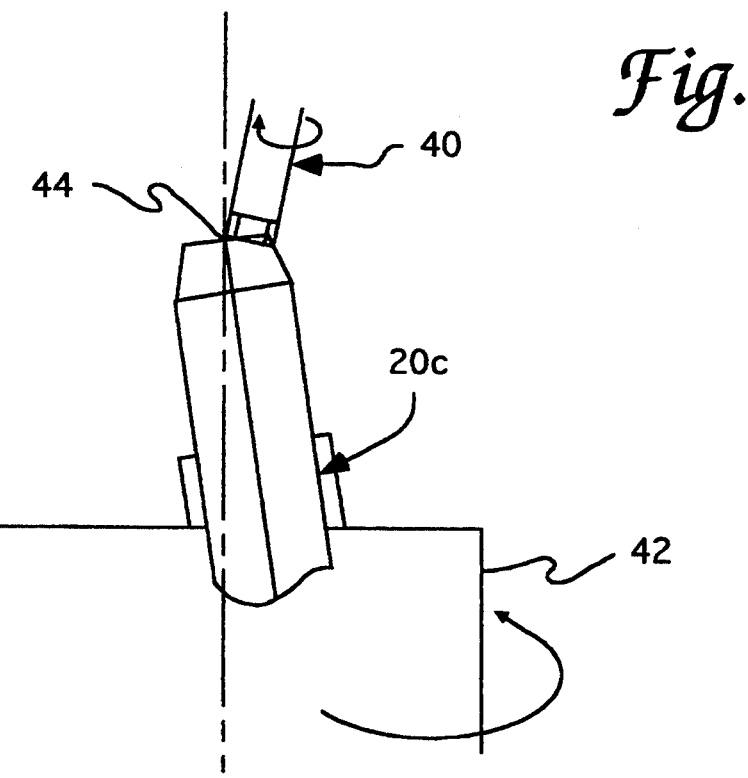
FIGS. 5 and 6 are side elevational views illustrating yet another method of constructing a ferrule in accordance with the present invention, wherein a concave generator tool forms a temporary surface which is then polished at a steeper angle than the desired angle of inclination.
Figure 6:
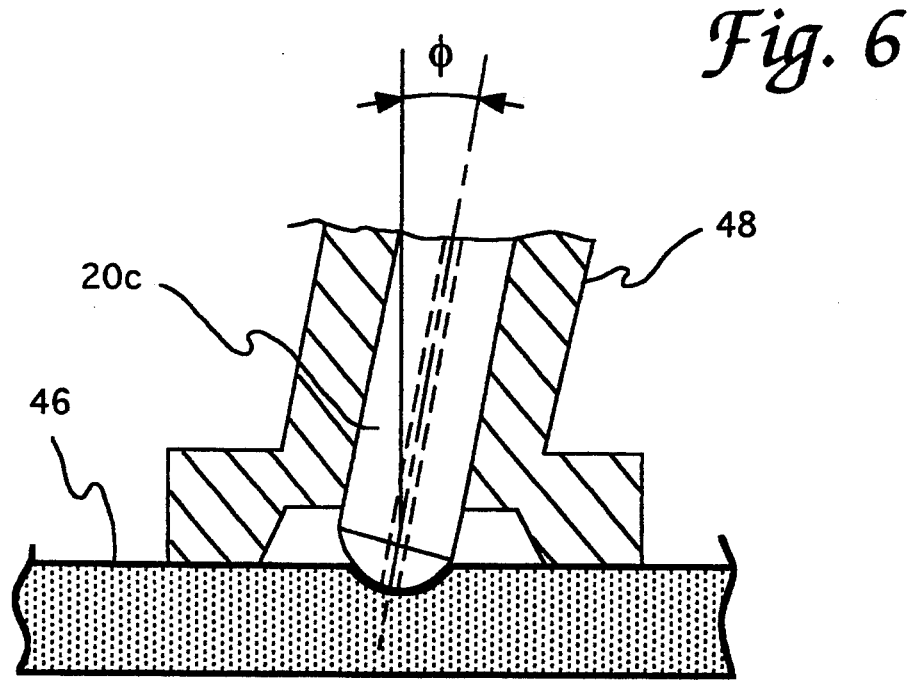

A third method utilizes a high speed spindle curve generator to initially form and center the convex radius, as depicted in FIG. 5. A concave generator tool 40, such as the industrial diamond tools available from General Industrial Diamond Tool Co., Inc., of Whippany, N.J., may easily generate a spherical, angled end face whose apex is rigidly held on the optical axis, regardless of unequal material around the endface due to the chamfer. The ferrule 20c is held at the desired angle of inclination in a spindle 42 whose axis coincides with the point 44 at which the optical center of ferrule 20c intersects its end face. Spindle 42 rotates at a speed of 500–1000 rpm, while tool 40 rotates at 8,000–12,000. Since this procedure might damage any fiber held in ferrule 20c, the optical fiber is inserted into ferrule 20c (and bonded) after this initial grinding step. Final PC polishing takes place with a compliant pad 46 and ferrule 20c held at the steeper orientation $\phi$ given by the above-equation. This method lends itself to automation and yet provides for easy field installation employing a simple, single cavity hand fixture 48 as shown in FIG. 6. As with the other methods disclosed herein, this polishing process results in an optical fiber whose terminal end is generally spherical and continuous with the spherical end face of the ferrule.

Figure 7:
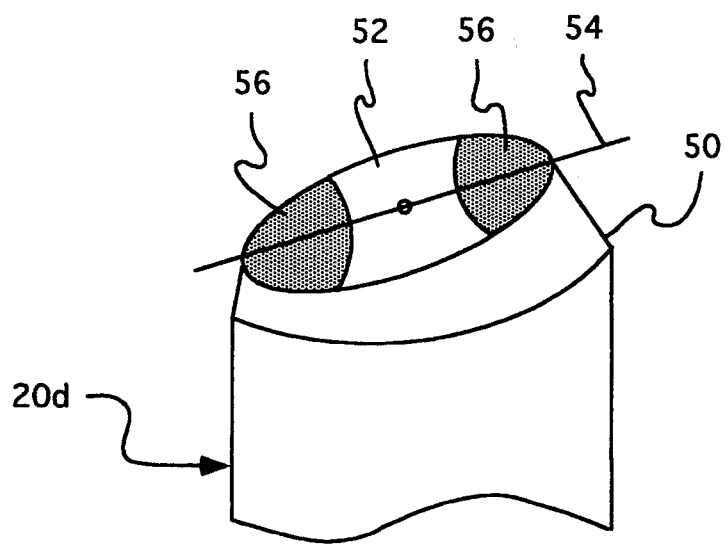
FIG. 7 is a perspective view depicting still another method of constructing a ferrule in accordance with the present invention, wherein a cylindrical surface is formed over the temporary flat surface.

Still another method of centering the apex is described in conjunction with FIG. 7. A flat angled surface is first formed on the chamfered tip 50 of a ferrule 20d as with the foregoing methods. In this method, however, a cylindrical surface 52 is next formed such as by grinding tip 50 against a cylindrically concave backing, supporting appropriate abrasive material, such as loose particle abrasives or lapping film. The axis 54 of the cylindrical surface is parallel to the gradient of the prior flat surface, i.e., parallel to the inclination axis. This embodiment also recalls the discussion in the Description of the Prior Art concerning the definition of "apex" and the meaning of a "spherical" surface. Surface 52 is not strictly spherical but, nevertheless, the cylindrical shape of surface 52 sufficiently approximates a spherical surface to enable one skilled in the art to identify its apex, i.e., that point where the tangent of the surface is generally parallel with the plane of incidence. Therefore, the term "spherical" should be construed as including such cylindrical surfaces.

While the embodiment of FIG. 7 yields more stability with respect to rotational forces, due to the surface relief orthogonal to the inclination axis, it also places a greater burden on the accuracy of the angle of inclination. One method of reducing this burden is providing shallow relief angles as illustrated by shaded areas 56 in FIG. 7. These relief areas may be molded in to tip 50 rather than machined. Indeed, those skilled in the art will appreciate that many of the foregoing constructions may theoretically be molded into place, but the state of the art is presently incapable of providing the required precision in molding. The concentricity of the fiber hole to the outer diameter would have to be within 1.0 μm, and the outer diameter itself would have to be within 1.0 μm.

Figure 8:
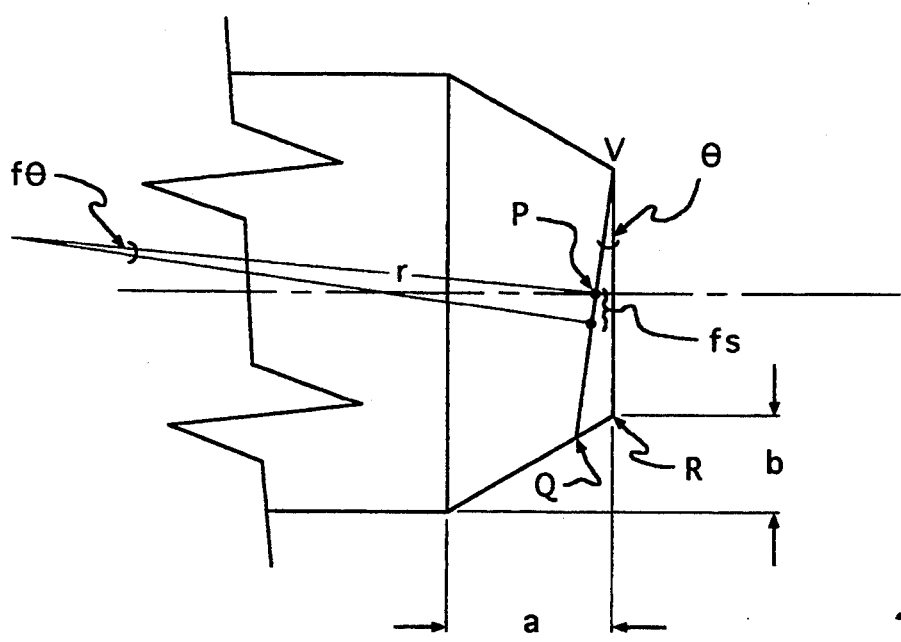
FIG. 8 is a side elevational view illustrating a method of constructing a ferrule in accordance with the present invention, wherein the spherical surface is formed in a single polishing operation.

The final method disclosed herein accomplishes the goal of centering the angled end face apex on the optical axis while still using a compliant rubber backing throughout the polishing procedure. In this process, the starting end face diameter, desired radius of curvature, and polishing angle must all be tightly controlled to attain repeatable results. In FIG. 8, $\theta$ is again the desired angle of inclination, r is the desired radius of curvature of the finished spherical end face, a is the height of the chamfer and b is its width, VR is the starting diameter of the end face, and VQ is the effective diameter of the inclined surface. It has been determined that the apex of the final, spherical surface can be centered on the fiber axis in a single polishing step, by polishing the ferrule at an angle $\theta$ which is slightly greater than $\theta$, specifically, $$\psi = \theta + f\theta,$$

where $$f\theta = \frac{fs}{r}$$

$$fs = \frac{VQ}{2} - VP$$

$$VQ = \frac{VR\sin\left(\tan^{-1}\left(\frac{a}{b}\right)\right)}{\sin\left(\tan^{-1}\left(\frac{a}{b}\right) - \theta\right)}$$

and $$VP = \frac{VR/2}{\cos\theta}.$$

Using these equations for a typical ferrule (VR=1.41 mm, a=0.93 mm, b=0.55 mm) results in the following calculations:

$$VQ = \frac{(1.41 \text{ mm})\sin\left(\tan^{-1}\left(\frac{0.93}{0.55}\right)\right)}{\sin\left(\tan^{-1}\left(\frac{0.93}{0.55}\right) - 8°\right)} = 1.553 \text{ mm}$$

$$VP = \frac{1.41 \text{ mm}/2}{\cos 8°} = 0.7119 \text{ mm}$$

and $$fs = \frac{1.553 \text{ mm}}{2} - 0.7119 \text{ mm} = 0.0646 \text{ mm}.$$

Assuming a radius of curvature of 6 mm, $$f\theta = \frac{0.0646 \text{ mm}}{6 \text{ mm}} = 0.01077 \text{ radians} = 0.62°$$

and $$\psi = 8° + 0.62° = 8.62°.$$

The principle at work in this method accounts for the expected amount of drift of the apex by applying a steeper angle to the end face, such that the resulting angle over the optical center (fiber axis) is $\theta$ when a specific radius is applied. This may present some difficulty when attempting to polish several ferrules simultaneously with a multiple ferrule jig, since such a setup does not apply pressure evenly on each ferrule, resulting in different effective radii of curvature. For example, if the radius is assumed to be 10 mm (instead of 6 mm), then the corresponding polishing angle is 8.370 instead of 8.62°, and polishing at the 8.62° angle will not adequately center the apex. Any machine can be used provided that the polishing force applied to each ferrule can be independently controlled, thereby controlling the effective radii; the machine described in U.S. Pat. No. 5,107,627 could be modified to fabricate several ferrules simultaneously. The force to be applied to induce a given radius of curvature must be determined empirically.

All of the foregoing methods yield connectors providing very low reflectivity (typically −70 to −80 dB) and low attenuation (~0.2 dB) with excellent stability (±0.02 dB); these results are based on a 1300 nm light source. The apex of all end faces were within 50 μm of the fiber axis, and most were within 10 μm. Performance levels are essentially unaffected by dust, thermal changes, axial and radial forces, and repeated matings, as compared with prior art connectors. Field terminations are easily accomplished with low cost tooling. The resulting connectors are fully mateable with the connector design of U.S. Pat. No. 5,140,660, but connectors made in accordance with the present invention are much less likely to scrape the receptacle coupling sleeve and are more adaptable to receptacles of electro-optical devices.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the present invention may be employed to create attenuators in addition to connectors. It is therefore contemplated that such modifications can be made without departing from the spirit or scope of the present invention as defined in the appended claims.

We claim:

1. An article for use in an optical fiber connector, comprising:
   a generally cylindrical body having a central bore and a distal end;
   said distal end of said body having a chamfered surface and a generally spherical end face adjacent said chamfered surface; and
   said spherical end face being inclined with respect to a normal of said bore, said end face further having an apex which approximately coincides with said bore.

2. The article of claim 1 wherein said apex of said spherical surface is within 50 μm of said bore.

3. The article of claim 1 wherein said inclined, spherical end face defines an angle of inclination in the range of 2°–20°.

4. The article of claim 1 wherein said body has a longitudinal axis and said central bore is parallel with said longitudinal axis.

5. The article of claim 1 further comprising an optical fiber located in said bore of said body and terminating at said distal end, said optical fiber having an end face whose shape is generally spherical and continuous with said spherical end face of said body.

6. The article of claim 1 wherein said apex of said spherical surface is within 10 μm of said bore.

7. In an optical fiber connector having a ferrule, the ferrule having a distal end and a central bore which receives an optical fiber terminating at said distal end, said distal end further having a chamfered surface and a generally spherical end face adjacent said chamfered surface, said spherical end face being inclined with respect to said bore, defining a plane of inclination, and said optical fiber having an end face whose shape is generally spherical and continuous with said spherical end face of said ferrule, the improvement comprising:
   said spherical end face defining a tangent at said bore which is generally parallel with said plane of inclination.

* * * * *